United States Patent
Nishiyama et al.

(10) Patent No.: US 6,333,804 B1
(45) Date of Patent: Dec. 25, 2001

(54) OPTICAL MODULE FOR RECEIVING OPTICAL SIGNAL FROM OPTICAL FIBER

(75) Inventors: Naoki Nishiyama; Mitsuaki Nishie, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/116,583

(22) Filed: Jul. 16, 1998

(30) Foreign Application Priority Data

Jul. 16, 1997 (JP) .................................................. 9-191646

(51) Int. Cl.$^7$ .................................................. H04B 10/06
(52) U.S. Cl. ........................................ 359/189; 250/214 A
(58) Field of Search ..................................... 359/189, 195; 250/214 A, 214 LA, 214 LS, 214.1

(56) References Cited

U.S. PATENT DOCUMENTS

| | | |
|---|---|---|
| 4,085,411 | 4/1978 | Genesi . |
| 4,131,791 * | 12/1978 | Lego, Jr. ............................. 359/169 |
| 4,454,416 * | 6/1984 | Gontowski, Jr. et al. ....... 250/214 A |
| 4,498,001 * | 2/1985 | Smoot ............................... 250/214 A |
| 4,857,725 * | 8/1989 | Goodnough et al. ............ 250/214 A |
| 5,256,986 | 10/1993 | Flocke et al. . |
| 5,294,802 * | 3/1994 | Kunishige ............................ 250/561 |
| 5,313,266 * | 5/1994 | Keolian et al. ...................... 356/477 |
| 5,329,115 * | 7/1994 | Lim ................................... 250/214 R |
| 5,479,288 * | 12/1995 | Ishizuka et al. ..................... 359/163 |
| 5,663,821 * | 9/1997 | Suda et al. .......................... 359/152 |
| 5,734,300 * | 3/1998 | Yoder .................................. 359/194 |
| 5,760,939 * | 6/1998 | Nagarajan et al. .................. 359/161 |
| 5,844,445 * | 12/1998 | Takeyari .............................. 330/293 |
| 5,875,047 * | 2/1999 | Abe et al. ............................ 359/152 |
| 5,880,582 * | 3/1999 | Sawada ................................ 323/315 |

* cited by examiner

Primary Examiner—Jason Chan
Assistant Examiner—Christina Y Leung

(57) ABSTRACT

This optical module comprises a photodiode 1, a current mirror circuit 2 having two parallel lines, one of the lines being connected to the photodiode 1, and a transimpedance amplifier 3 connected to the photodiode 1. Since the current mirror circuit 2 is provided, the photocurrent from the line flows into the photodiode 1 and amplified by the transimpedance amplifier 3. This photocurrent is observed as a current flowing out of the other line of the current mirror circuit 2.

4 Claims, 13 Drawing Sheets

OPTICAL MODULE FOR RECEIVING OPTICAL SIGNAL FROM OPTICAL FIBER

BACKGROUND OF THE INVENTION

1. Field of the Invention

The present invention relates to an optical receiver which converts an optical signal fed into a photodiode to an electric signal.

2. Related Background Art

FIG. 14 shows a basic configuration of a conventional optical receiver. An optical signal OS is converted into its corresponding electric signal by a photodiode 1. Thus formed photocurrent is converted into a voltage signal by a preamplifier (transimpedance amplifier, current-voltage converter circuit) 3 comprising an amplifier 3a and a transimpedance 3b, and the resulting signal is transmitted to a data-identifying/reproducing and clock-extracting circuit 4.

It is often necessary for the conventional optical receiver to monitor an average input light intensity. Though the average value of the photocurrent generated in the photodiode has to be detected therefor, no circuit for this purpose can be inserted in the anode of the photodiode 1. This is because the preamplifier 3 is connected to the anode of the photodiode 1 and, consequently, another circuit element connected thereto would deteriorate waveforms of signals, in particular, in high-frequency bands used for optical signal transmission.

SUMMARY OF THE INVENTION

The optical receiver in accordance with the present invention comprises a photodiode for receiving an optical signal emitted from an optical fiber; a current mirror circuit having two parallel lines with respective currents flowing therethrough at levels in proportion to each other, one of the lines being connected to one end of the photodiode; and a transimpedance amplifier connected to the other end of the photodiode.

In this optical receiver, in the case where the photodiode is cathode-grounded, since the current mirror circuit is provided, the photocurrent flowing into the photodiode can be amplified by the transimpedance amplifier and observed as a current flowing out of the photodiode by way of the other line. In the case where the photodiode is anode-grounded, since the current mirror circuit is provided, the photocurrent flowing out of the photodiode can be amplified by the transimpedance amplifier and observed as a current flowing into the photodiode by way of the other line.

Preferably, the optical receiver in accordance with the present invention further comprises a resin material for molding the transimpedance amplifier or current mirror circuit.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, optical modules in accordance with embodiments will be explained. Constituents identical to each other or those having functions identical to each other will be referred to with numerals or letters identical to each other without repeating their overlapping explanations. Also, the following embodiments will be explained only in terms of their distinguishable constituents in cases where there are identical constituents among them.

First Embodiment

Figure 1:
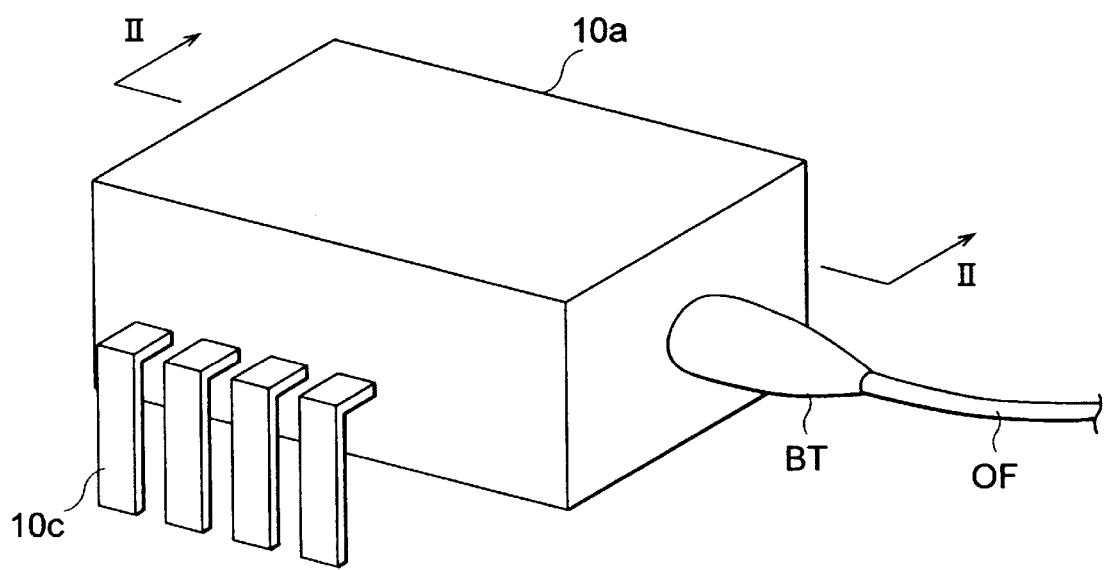
FIG. 1 is a perspective view showing an optical module 10 in accordance with a first embodiment.

FIG. 1 is a perspective view showing an optical module 10 in accordance with the first embodiment.

The optical module 10 comprises a resin material (resin package) 10a assembled with assembling members; a plurality of lead terminals 10c drawn out of the resin material 10a; and a boot member BT holding an end portion of an optical fiber OF and projecting from one side face (hereinafter referred to as front face) of a tip part of the resin material 10a.

Figure 2:
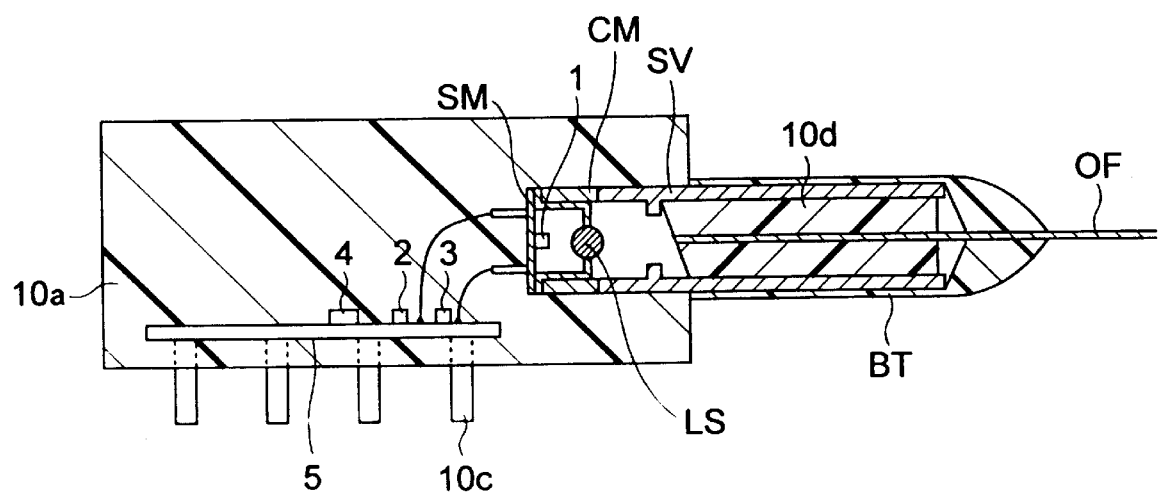
FIG. 2 is a sectional view of the optical module 10 taken along the arrowed line II—II of FIG. 1.

FIG. 2 is a sectional view of the optical module 10 taken along the arrowed line II—II of FIG. 1. Embedded within the resin material 10a is a sleeve sv in which an optical fiber OF surrounded by the ferrule 10d is disposed. The ferrule 10d is a cylindrical shell comprising a cylindrical inserting portion for inserting the end portion of the optical fiber OF therein.

The end face of the optical fiber OF within the sleeve Sv faces a photodiode 1 via a lens LS, the photodiode 1 being fixed to the inside of a support member SM, the support member SM attached to one end of the opening of the sleeve SV via a connecting member CM. The support member SM functions as a lid of a can-type package of the photodiode 1. The sleeve SV and connecting member CM constitute a position fixing member that attaches optical fiber OF to the package 10a.

The photodiode 1 is electrically connected to a current mirror circuit 2 and a transimpedance circuit 3 which is connected to a data-identifying/reproducing and clock-extracting circuit 4.

In this embodiment, the current mirror circuit 2, the transimpedance circuit 3, and the circuit 4 are disposed on a wiring board (lead-frame) 5, and are molded and embedded within the resin material 10a.

Figure 3:
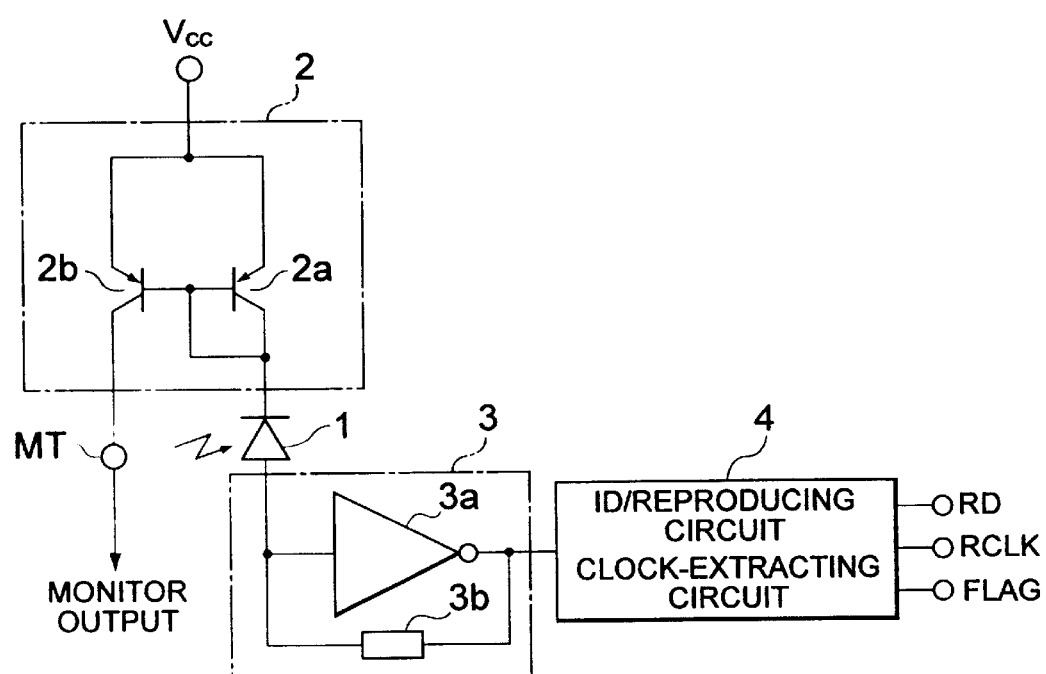
FIG. 3 is a circuit diagram of the optical module in accordance with the above-mentioned embodiment.

FIG. 3 is a circuit diagram of the optical module in accordance with this embodiment. The current mirror circuit 2 is constituted by a pnp transistor 2a whose collector and base are short-circuited therebetween and a pnp transistor 2b substantially identical thereto in terms of characteristics. The respective bases of these two transistors 2a, 2b are connected in common, whereas their emitters are commonly connected to a positive power supply Vcc. The transistors 2a and 2b have characteristics nearly identical to each other and are disposed close to each other on the same board 5, thereby operating under the same environment. These transistors may also be fabricated on the same semiconductor chip.

The collector of the transistor 2a is connected to the cathode of the photodiode 1, whereas the anode of the photodiode 1 is connected to the data-identifying/ reproducing and clock-extracting circuit 4 by way of the transimpedance amplifier 3.

The photodiode 1 is a light-receiving device which receives an optical signal incident thereon and outputs a current signal corresponding to the quantity of light of this optical signal. For example, as a semiconductor light-receiving device, a PIN photodiode having a diameter of 50 μm made of InGaAs is preferably used. The optical signal received by the photodiode 1 is signal light containing data in a predetermined cycle. This signal can transmit data, in synchronization with a clock signal, at a bit rate (e.g., 2.4 Gb/s) corresponding to the above-mentioned cycle.

The transimpedance amplifier 3 converts the photocurrent generated in the photodiode 1 into its corresponding voltage signal. Preferably employable as the transimpedance amplifier 3 is, for example, an amplifier circuit comprising an amplifier made of GaAs and a feedback resistance element connected between the input and output thereof.

The collector potential of the transistor 2a is a potential lower than the positive power supply Vcc by the base-emitter voltage of the transistor 2a. This base-emitter voltage equals the forward clamping voltage of the diode and is set to about 0.7 to 0.8 V under normal operating conditions of the transistor 2a. As a consequence, the cathode potential of the photodiode 1 becomes Vcc−(0.7 to 0.8) V, whereby a sufficient reverse bias voltage is applied to the photodiode 1. Since the base-emitter voltage of the transistor 2b perfectly equals the base-emitter voltage of the transistor 2a, the current flowing out of the collector of the transistor 2b is made equal to the current flowing into the cathode of the photodiode 1. The collector of this transistor 2b can be utilized as an input terminal of a monitor circuit for a monitoring the photocurrent, i.e., a photocurrent monitor terminal MT.

Figure 4:
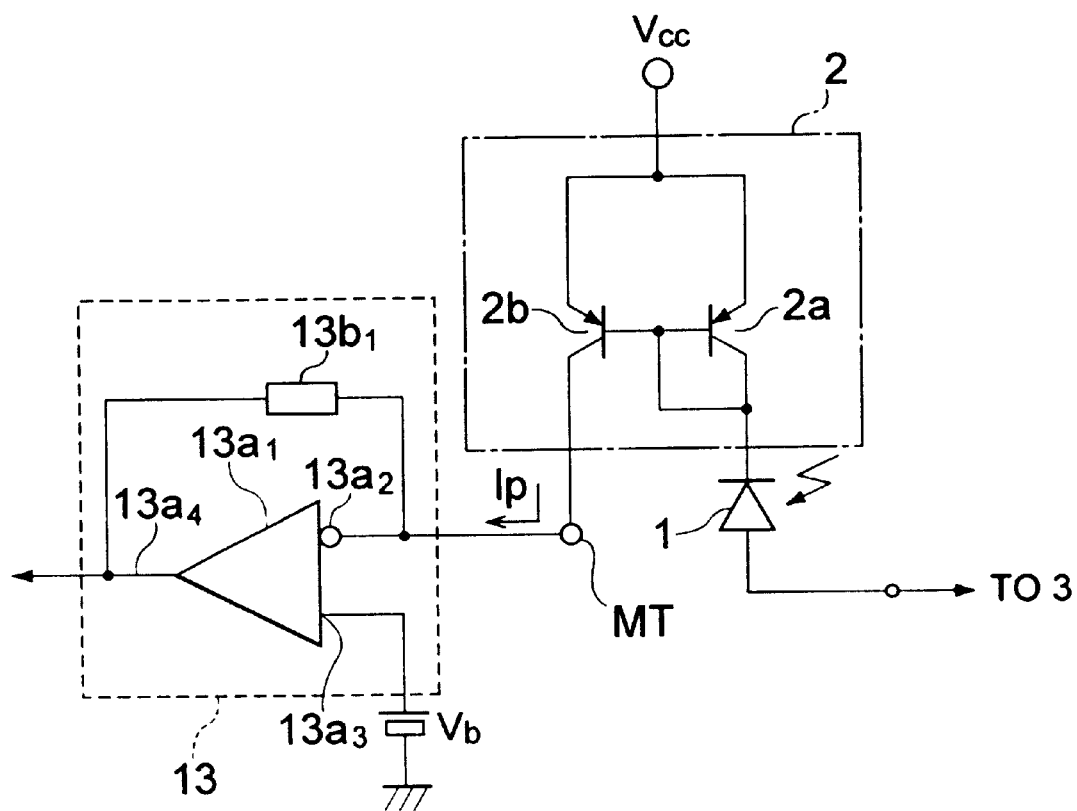
FIG. 4 is a circuit diagram including a monitor circuit 13.

FIG. 4 is a circuit diagram including a monitor circuit 13 mentioned above. The monitor circuit 13 comprises a current-voltage converter circuit 13 constituted by an operational amplifier (Op-Amp) $13a_1$ and a transimpedance $13b_1$.

Connected between an inverting input terminal $13a_2$ and an output terminal $13a_4$ of the Op-Amp $13a_1$ is a resistor $13b_1$ for current-voltage conversion. Connected to a noninverting input terminal $13a_3$ of the Op-Amp $13a_1$ is a bias power supply Vb. In this circuit, when the photocurrent monitor terminal MT is connected to the inverting input terminal $13a_2$, the current equivalent to the photocurrent 1p flowing out of the collector of the transistor 2b does not flow into the input of the Op-Amp $13a_1$ but mostly appears at the output terminal by way of the resistor $13b_1$. Due to the feedback effect of the resistor $13b_1$, the Op-Amp $13a_1$ operates such as to hold the potential between its two input terminals at zero, whereby the potential of the inverting input terminal $13a_2$ of the Op-Amp $13a_1$ is made equal to the potential Vb of the noninverting input terminal $13a_3$. A voltage of (Vb−1p×R) is hence generated at the output terminal, whereby the photocurrent can be detected by monitoring this voltage.

When a resistor is inserted between the emitter of at least one of the transistors 2a and 2b and the positive power supply Vcc, the sum of the base-emitter voltage of one of the transistor to which the resistor is inserted and the voltage decrease at thus inserted resistor equals the base-emitter voltage of the other transistor to which the resistor is not inserted, whereby the level of monitor current 1p can be changed while the ratio between the respective currents flowing through both transistors is held constant.

For example, when a resistor is inserted between the emitter of the transistor 2a and the positive power supply Vcc, the base-emitter voltage of the transistor 2b becomes greater than the base-emitter voltage of the transistor 2a. Consequently, the level of monitor current 1p can be made greater than the level of photocurrent actually flowing into the photodiode 1. On the other hand, when a resistor is inserted between the emitter of the transistor 2b and the positive power supply Vcc, while the emitter of the transistor 2a is directly connected to the positive power supply Vcc, the level of monitor current 1p can be made smaller than the photocurrent. Namely, the current mirror circuit has two parallel lines with respective currents flowing therethrough at levels in proportion to each other, while one of the lines is connected to one end of the photodiode.

Figure 5:
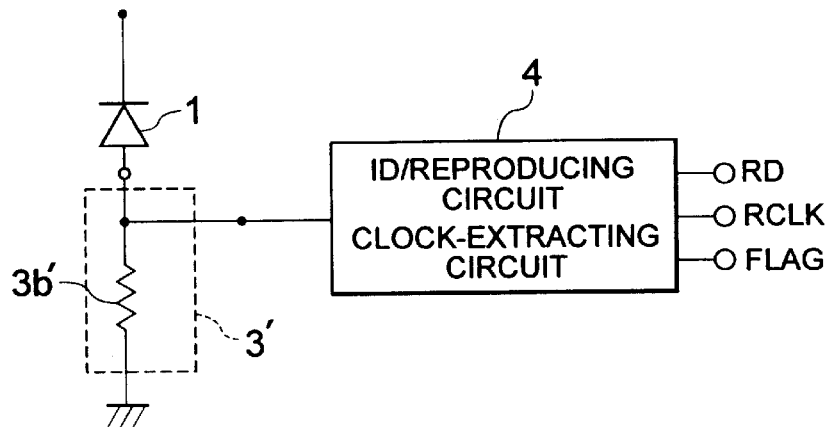
FIG. 5 is a circuit diagram showing a modified example of transimpedance amplifier 3.

FIG. 5 shows a modified example of the transimpedance amplifier 3. This optical module can employ, in place of the transimpedance amplifier 3, a current-voltage converter circuit 3' consisting of a resistor 3b' shown in FIG. 5.

Second Embodiment

Figure 6:
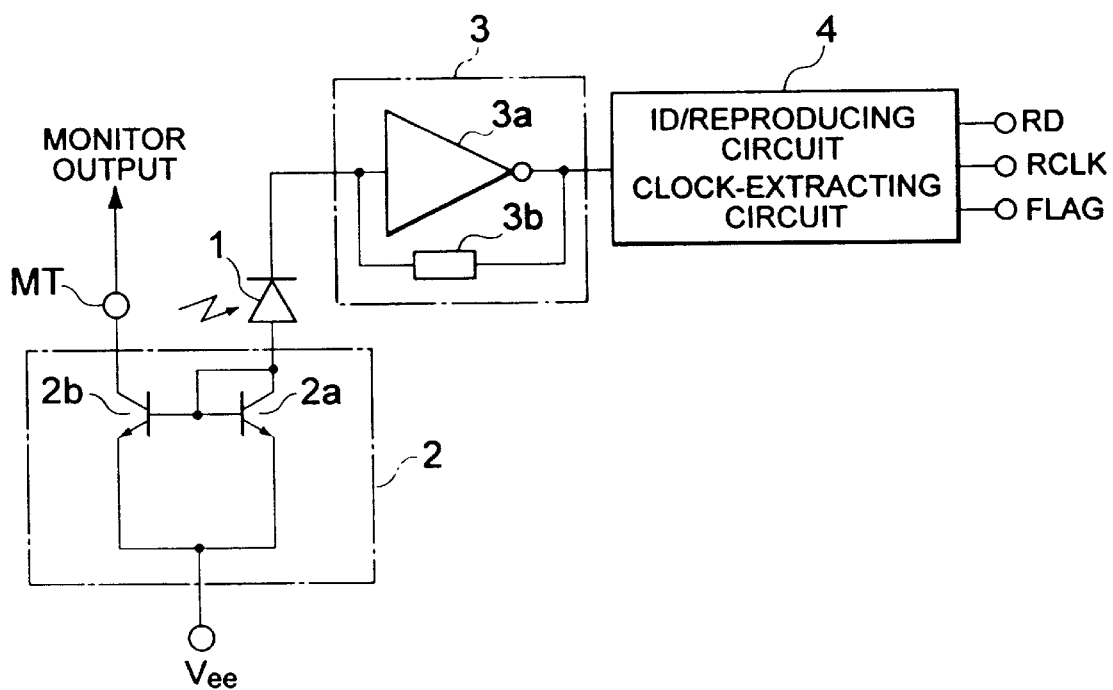
FIG. 6 is a circuit diagram of an optical module in accordance with a second embodiment.

FIG. 6 shows a circuit diagram of an optical module in accordance with the second embodiment. The configuration thereof not depicted here is identical to that of the first embodiment. Depicted current mirror circuit 2 is constituted by an npn transistor 2a whose collector and base are short-circuited therebetween and an npn transistor 2b substantially identical thereto in terms of characteristics. The respective bases of these two transistors 2a, 2b are connected in common, whereas their emitters are commonly connected to a negative power supply Vee. The transistors 2a and 2b have characteristics nearly identical to each other and are mounted close to each other, thereby operating under the same environment. These transistors may also be fabricated on the same semiconductor chip.

The collector of the transistor 2a is connected to the anode of a photodiode 1, whereas the cathode of the photodiode 1 is connected to a data-identifying/reproducing and clock-extracting circuit 4 by way of a transimpedance amplifier 3. The transimpedance amplifier 3 converts a photocurrent generated in the photodiode 1 into a voltage signal corresponding thereto. As a consequence of this configuration, the collector potential of the transistor 2a is a potential higher than the negative power supply Vee by the base-emitter voltage of the transistor 2a. This base-emitter voltage equals the forward clamping voltage of the diode. Under normal operating conditions of the transistor 2a, the clamping voltage is set to about 0.7 to 0.8 V. As a consequence, the anode of the photodiode 1 attains a potential of Vee+(0.7 to 0.8) V, whereby a sufficient reverse bias voltage is applied to the photodiode 1. Since the base-emitter voltage of the transistor 2b perfectly equals the base-emitter voltage of the transistor 2a, the current flowing into the collector of the transistor 2b is made equal to the current flowing out of the anode of the photodiode 1. Hence, the collector of this transistor 2b can be utilized as a photocurrent monitor terminal MT.

The npn transistor shown in FIG. 6 may be replaced by n-channel field-effect transistors (n-FETs). Namely, in this case, the respective gates of two n-FETs having substantially the same characteristics are connected together, and the drain and gate of one FET are short-circuited therebetween, whereas the anode of the photodiode 1 is connected to the drain of this FET. The photocurrent flowing out of the photodiode 1 can be monitored by observing the current flowing into the drain of the other FET.

Third Embodiment

Figure 7:
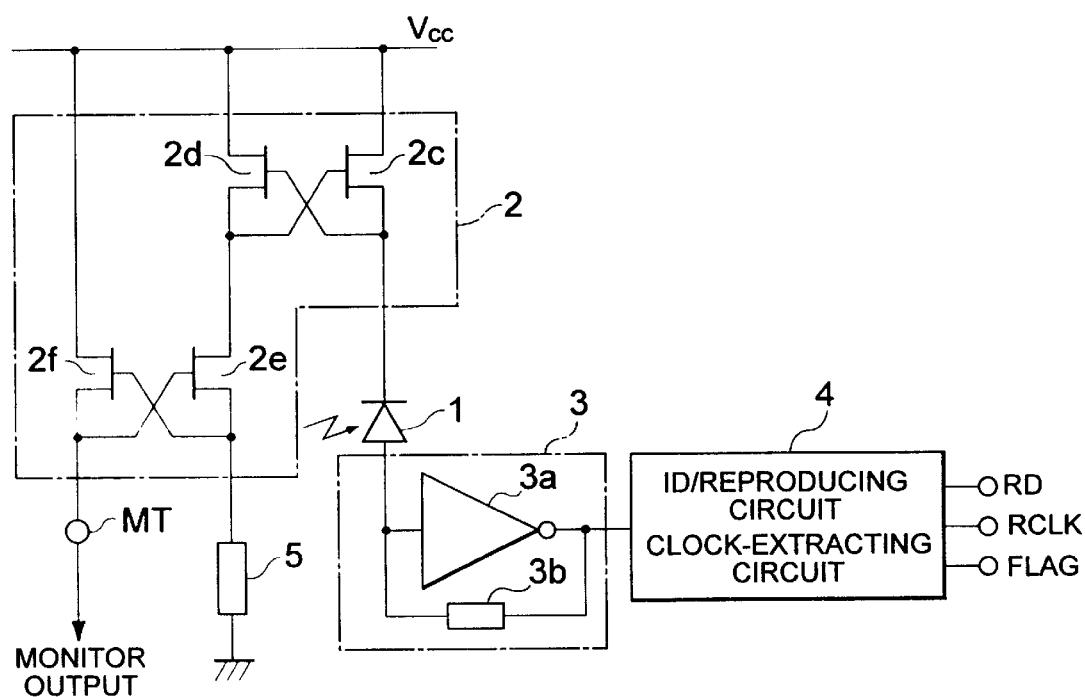
FIG. 7 is a circuit diagram of an optical module in accordance with a third embodiment.

FIG. 7 shows a circuit diagram of an optical module in accordance with the third embodiment. The configuration thereof not depicted here is identical to that of the first embodiment. This optical module is an example in which the current mirror circuit 2 for the current flowing out of the positive power supply side is constituted by n-channel FETs 2c, 2d, 2e, and 2f. The anode of a photodiode 1 is connected to a transimpedance amplifier 3. The gates and sources of the n-FETs 2c and 2d are connected to each other in a crossing fashion, whereas their drains are connected to a positive power supply Vcc. The source of the n-FET 2c is connected to the cathode of the photodiode 1, whereas the source of the n-FET 2d is connected to the drain of the FET 2e in a circuit constituted by the n-FETs 2e and 2f whose gates and sources are connected to each other in a crossing fashion. The drain of the FET 2f is connected to the positive power supply Vcc.

The n-FETs 2c to 2f have substantially the same characteristics and are mounted close to each other, thereby operating under the same condition. They may also be fabricated on the same semiconductor chip. For monitoring the photocurrent generated in the photodiode 1, it is possible to employ not only a method in which the current flowing into the photodiode 1 from the positive power supply side is observed but also a method in which the current flowing out of the n-FET 2f is observed by way of a monitor terminal MT.

Employable as the above-mentioned n-FETs are GaAs-MESFET, Si-n-channel MOSFET, Si-n-channel JFET, and the like.

Fourth Embodiment

Figure 8:
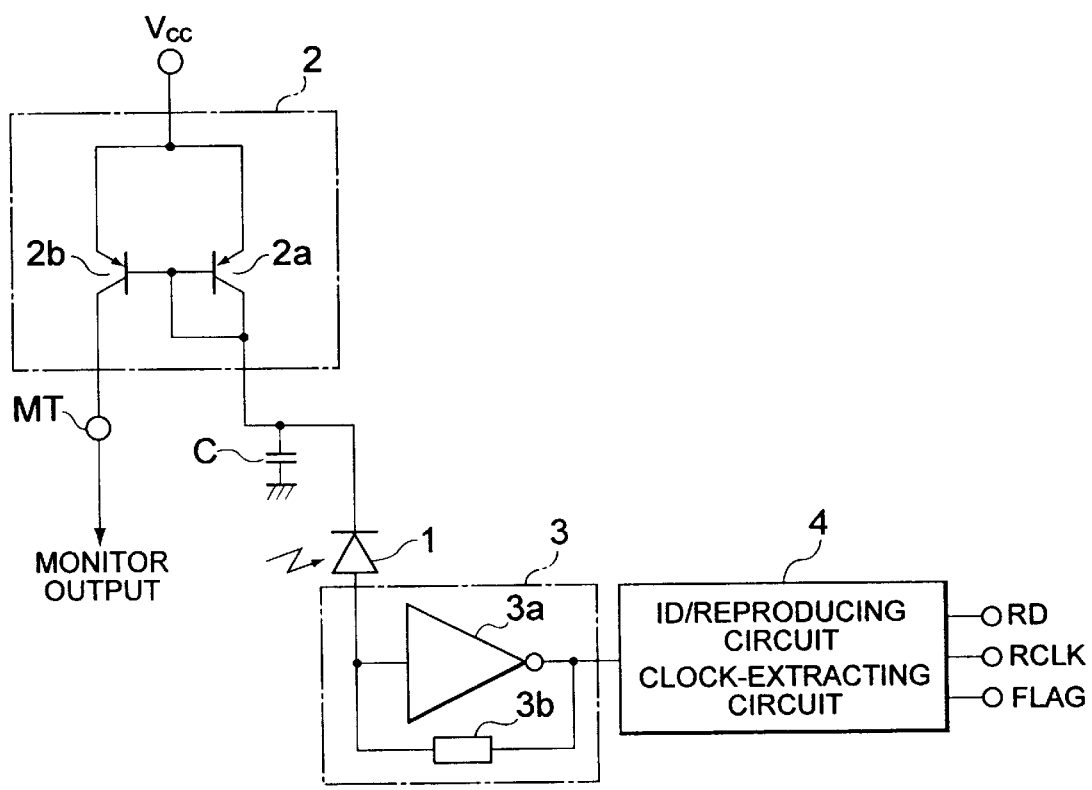
FIG. 8 is a circuit diagram of an optical module in accordance with a fourth embodiment.

FIG. 8 shows a circuit diagram of an optical module in accordance with the fourth embodiment. The configuration thereof not depicted here is identical to that of the first embodiment. Though the current mirror circuit 2 in each of the above-mentioned embodiments is preferably incorporated within the optical module, it can be disposed outside the optical module. In this case, the distance in wiring between the current mirror circuit 2 and the photodiode 1 becomes long. In such a case, since noise is likely to be superposed on the long wiring, a capacitor C is disposed in parallel to the wiring line connecting the current mirror circuit 2 and the photodiode 1. The capacitor C is disposed near the photodiode 1 or within the resin material 10a. The capacitor C is connected between the wiring line and the ground, thereby improving the resistance of photocurrent to noise. Here, even when the current mirror circuit 2 is not disposed outside the optical module, the circuit of FIG. 8 may be used when the wiring line is long.

Fifth Embodiment

Figure 9:
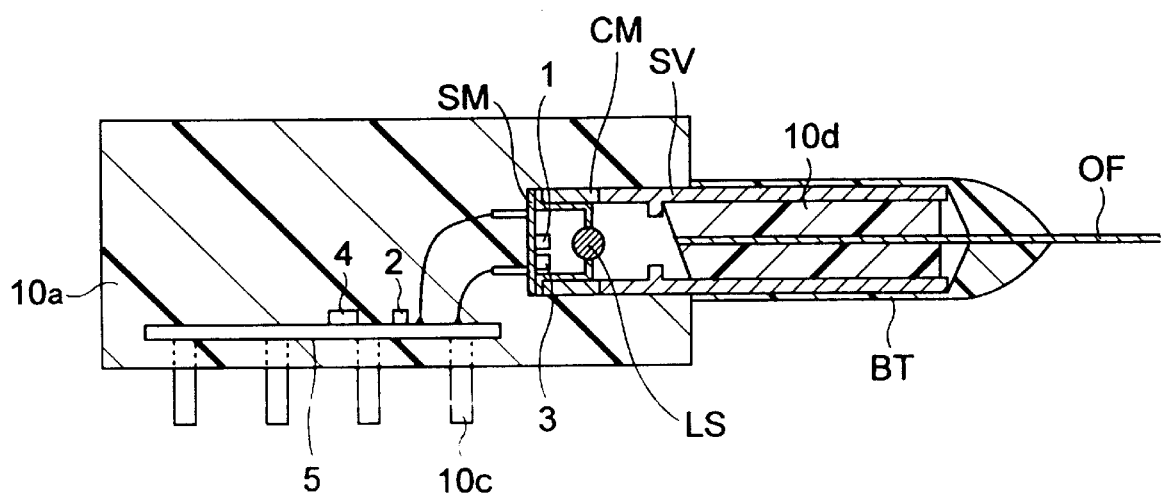
FIG. 9 is a sectional view of an optical module in accordance with a fifth embodiment.

FIG. 9 shows a sectional view of an optical module in accordance with the fifth embodiment. The configuration thereof not depicted here is identical to that of the first embodiment. In the fifth embodiment, the transimpedance amplifier 3 in the optical module described in the above-mentioned first to fourth embodiments is fixed to a surface of the support member SM, the surface facing the end of the optical fiber OF. In this case, since the transimpedance amplifier 3 and the photodiode 1 can be disposed close to each other, the noise superposed on the wiring therebetween can be reduced.

Sixth Embodiment

Figure 10:
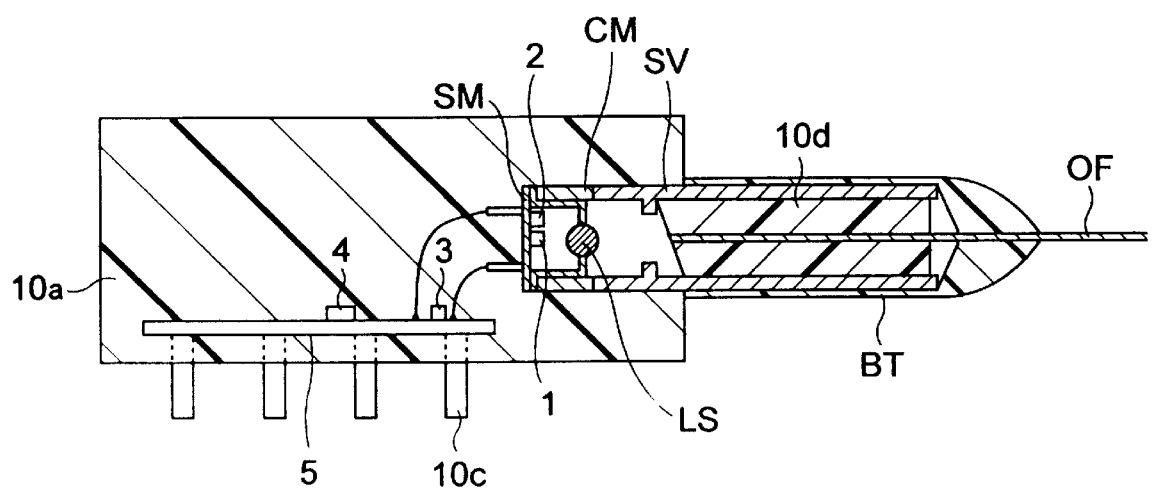
FIG. 10 is a sectional view of an optical module in accordance with a sixth embodiment.

FIG. 10 shows a sectional view of an optical module in accordance with the sixth embodiment. The configuration thereof not depicted here is identical to that of the first embodiment. In the optical module of the sixth embodiment, the current mirror circuit 2 in the optical module described in the above-mentioned first to fourth embodiments is fixed to the surface of the support member SM, the surface facing the end of the optical fiber OF. In this case, since the current mirror circuit 2 and the photodiode 1 can be disposed close to each other, the noise superposed on the wiring therebetween can be reduced.

Seventh Embodiment

Figure 11:
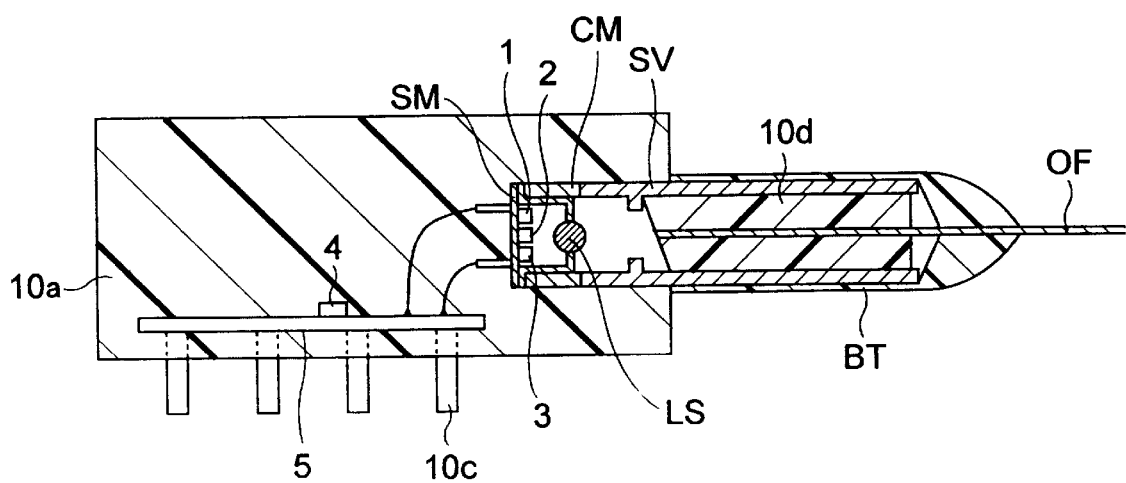
FIG. 11 is a sectional view of an optical module in accordance with a seventh embodiment.

FIG. 11 shows a sectional view of an optical module in accordance with the seventh embodiment. The configuration thereof not depicted here is identical to that of the first embodiment. In the optical module of the seventh embodiment, the current mirror circuit 2 and transimpedance amplifier 3 in the optical module described in the above-mentioned first to fourth embodiments are fixed to the surface of the support member SM, the surface facing the end of the optical fiber OF. In this case, since the photodiode 1, the current mirror circuit 2, and the transimpedance amplifier 3 can be disposed close to each other, the noise superposed on the wiring therebetween can be reduced.

Eighth Embodiment

Figure 12:
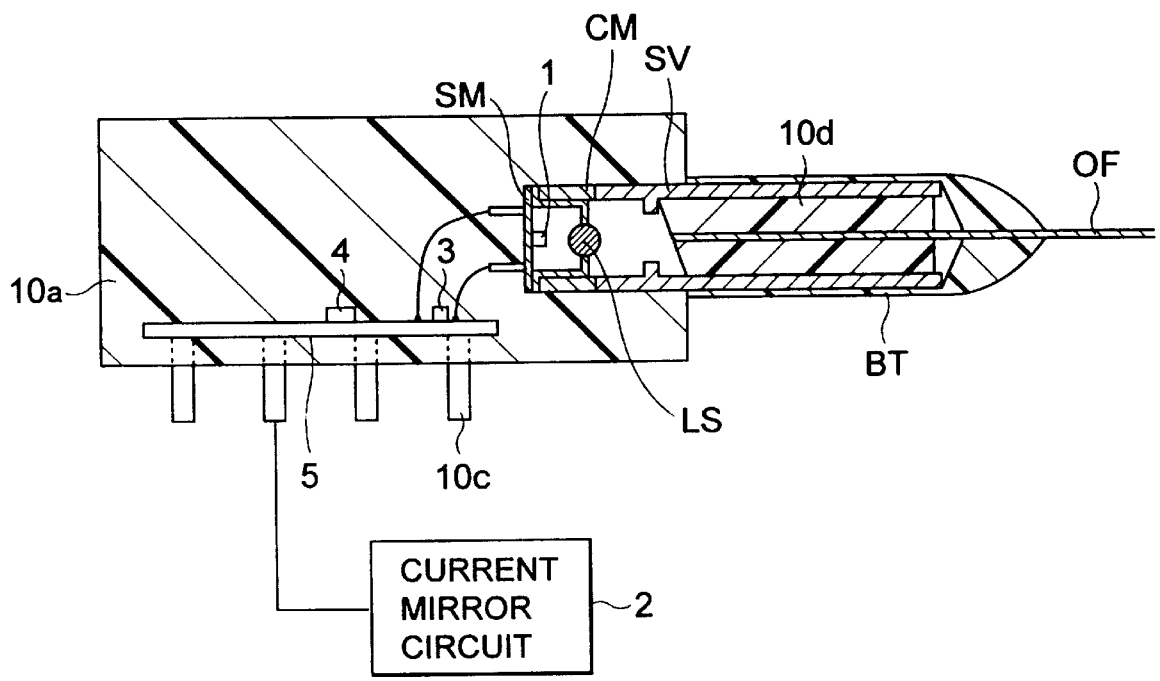
FIG. 12 is a sectional view of an optical module in accordance with an eighth embodiment.

FIG. 12 shows a sectional view of an optical module in accordance with the eighth embodiment. The configuration thereof not depicted here is identical to that of the fourth embodiment. In the optical module of the eighth embodiment, the current mirror circuit 2 in the optical module described in the fourth embodiment is disposed outside the optical module. Though the distance between the current mirror circuit 2 and the photodiode 1 is elongated, a capacitor C connected between the wiring line and the ground as shown in FIG. 8 can improve the resistance of photocurrent to noise.

Ninth Embodiment

Figure 13:
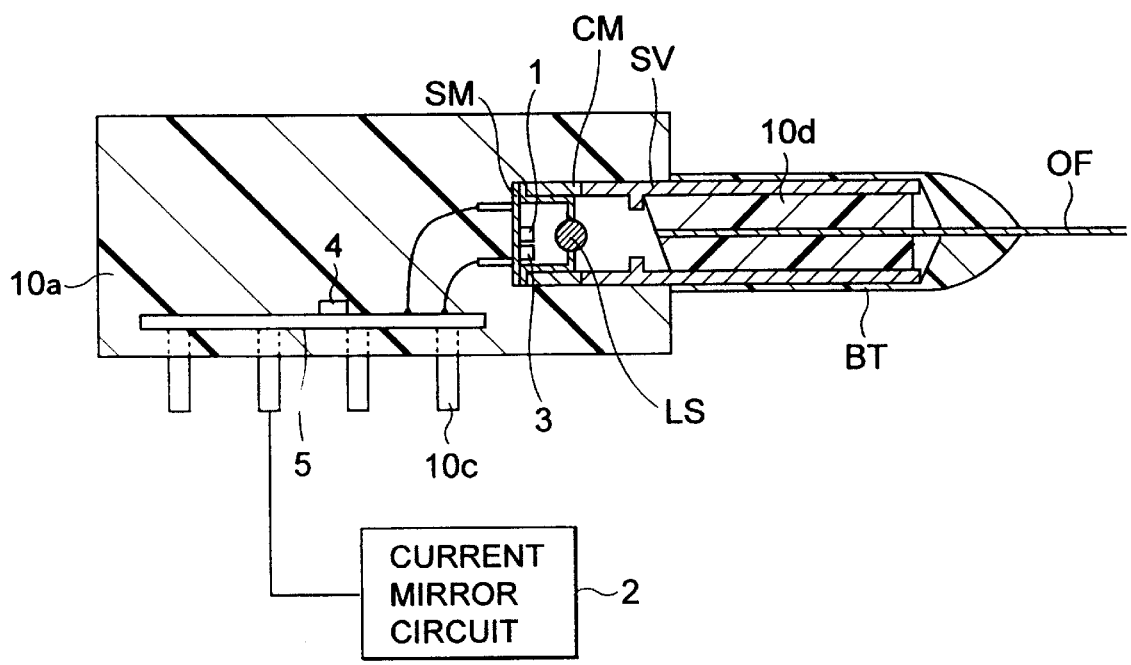
FIG. 13 is a sectional view of an optical module in accordance with an ninth embodiment.
Figure 14:
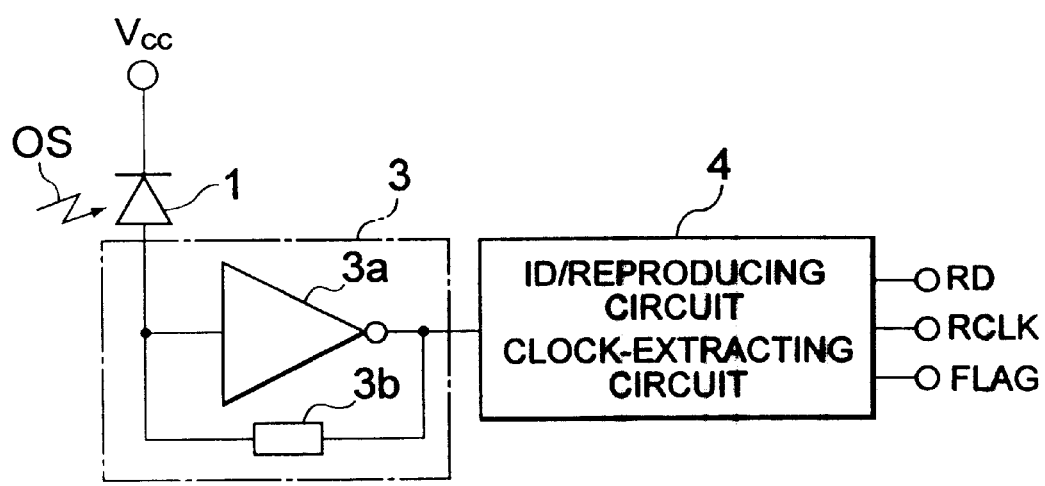
FIG. 14 is a circuit diagram showing a basic configuration of a conventional optical receiver.

FIG. 13 shows a sectional view of an optical module in accordance with the ninth embodiment. The configuration thereof not depicted here is identical to that of the eighth embodiment. The only difference from the module in FIG. 12 is that the transimpedance amplifier 3 is fixed to the inner surface of the support member SM.

As explained in the foregoing, since the current mirror circuit 2 is provided in the optical receivers in accordance with the above-mentioned embodiments, when the photodiode 1 is cathode-grounded, the photocurrent flowing into the photodiode 1 can be observed as a current flowing out of the photodiode 1. When the photodiode 1 is anode-grounded, since the current mirror circuit 2 is provided, the photocurrent flowing out of the photodiode 1 can be observed as a current flowing into the photodiode 1. Hence, tolerance can be remarkably enhanced in the circuit configuration of the monitor circuit 13.

A monitoring method to be compared with the system of the above-mentioned embodiments will now be explained. In this method, a current-detecting circuit and a photodiode are connected in series. In order to set a high photoelectric conversion efficiency in the photodiode, it is necessary to provide a sufficient potential difference between both terminals of the photodiode. On the other hand, the current-detecting circuit would not function normally unless a predetermined potential is set therein. Thus, there are various restrictions on detecting the average value of photocurrent at the cathode terminal of the photodiode. The average photocurrent flowing out of the photodiode is detected by a current-detecting means inserted between the anode of the photodiode and a negative power supply. Here, the circuit would not operate normally unless a sufficient bias is applied to both of the photodiode and the current-detecting means, either. The system in accordance with the above-mentioned embodiments has an advantage over the method in which a current-detecting circuit is inserted between the cathode of the photodiode and a positive bias terminal so as to detect the average value of photocurrent flowing into the photodiode. The optical receiver in accordance with any of the abovementioned embodiments can supply a sufficient bias potential to the photodiode 1 so that its photoelectric conversion efficiency would not decrease, while the photocurrent of the photodiode can be monitored sufficiently. Also, since monitoring can be effected without affecting characteristics of the photodiode 1, the monitor circuit can be designed easily.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical receiver comprising:

a photodiode configured and arranged to receive an optical signal emitted from an optical fiber;

a current mirror circuit, connected to one end of said photodiode;

a transimpedance amplifier connected to the other end of said photodiode;

a package, said photodiode, said current mirror circuit and said transimpedence amplifier being arranged therein;

a position fixing member attaching said optical fiber to said package; and a support member arranged in said package, supporting both of said photodiode and said transimpedance amplifier wherein said current mirror circuit has first and second n-channel field-effect transistors, said transistors having their respective gates connected to the other transistor's source.

2. An optical receiver according to claim 1, further comprising a capacitor, wherein one end of said capacitor is connected to a line that connects said photodiode to said current mirror circuit, wherein the other end of said capacitor is connected to ground, and wherein said capacitor is arranged near said photodiode that is arranged on said support member.

3. An optical receiver according to claim 1, wherein said package is comprised of resin material.

4. An optical receiver according to claim 1, wherein said current mirror circuit has two parallel lines with respective currents flowing therethrough at levels in proportion to each other, wherein one of said lines is connected to said photodiode and the other of said lines has a terminal for monitoring the photocurrent.

* * * * *